United States Patent [19]

Sims

[11] Patent Number: 5,080,791

[45] Date of Patent: Jan. 14, 1992

[54] APPARATUS FOR MULTISIZED FILTER ELEMENT CARTRIDGE INSERT FOR PAPER TOWEL FILTERS

[76] Inventor: Charles Sims, P. O. Box 2787, Gulfport, Miss. 39503

[21] Appl. No.: 421,769

[22] Filed: Oct. 16, 1989

[51] Int. Cl.⁵ .............................................. B01D 27/06
[52] U.S. Cl. .............................. 210/497.1; 210/497.3; 55/498; 55/521
[58] Field of Search ............. 210/497.01, 497.1, 494.1, 210/497.3; 55/498, 520, 521

[56] References Cited

U.S. PATENT DOCUMENTS

| | | | |
|---|---|---|---|
| 2,512,797 | 6/1950 | Harvout | 210/494.1 |
| 3,504,803 | 4/1970 | Brayman | 210/494.1 |
| 4,017,400 | 4/1977 | Schade | 210/497.1 |
| 4,454,036 | 6/1984 | Suzuki | 210/494.1 |

Primary Examiner—Robert A. Dawson
Assistant Examiner—Wanda L. Millard
Attorney, Agent, or Firm—Alexander Norcross

[57] ABSTRACT

An apparatus for adapting a paper towel filter to utilize a range of paper towel or filter element sizes. A perforated end plate is provided to engage the ends of the filter element. An inwardly sloped truncated conical extension from the center of the end plate extends into the ends of the filter element roll, which seats along the conical extension, based on its inner diameter. A pipe sealing face is provided along the inner surface of the conical extension, at the end away from the end plate; this face sealingly encloses an axial pipe. The combination of two end plates, so mounted on an axial pipe, and enclosing a paper towel roll, forms a removable filter cartridge for a paper towel filter, which readily adapts to a variety of sizes of paper towel rolls.

3 Claims, 3 Drawing Sheets

APPARATUS FOR MULTISIZED FILTER ELEMENT CARTRIDGE INSERT FOR PAPER TOWEL FILTERS

BACKGROUND OF THE INVENTION

This invention relates to the field of liquid filters, of the type commonly known as paper towel or toilet paper filters.

It has long been known that very fine filtration can be obtained, removing particulate contaminants from liquids, by flowing the liquids along an extended filter path across the surface formed between two adjoining sheets of filtration material. This filter action is in distinction to the more common filter action in which a liquid is forced through a membrane or porous material; in the latter case, proper filtration requires very careful design of the membrane, and the size of the particles successfully filtered is a function of membrane porosity and the uniformity of the membrane.

The usual form of the first above described filters is the axial flow, wound fibrous tissue filters, popularly known as paper towel filters. These filters use the filtration capability inherent in passing a fluid axially along the surface between two tightly adjoining sheets of fibrous tissue. The fluid does not pass through any given sheet and thus the normal manufacturing tolerances inherent in membrane or porous filters are not required. Significant work has been done on the design of such filters, because of the low cost and widespread availability of filter media in the form of commercially available paper towels, or toilet paper rolls. The disadvantage of all these filters is that such filter media are not designed or manufactured to be used in a filter and thus are neither dimensioned nor structured for this purpose.

As a result, significant effort has been expended in sealing elements of such filter media against bypass flow and in supporting such elements to provide the appropriate filtering action.

Such filters are shown in, for instance, S. K. Yee, et al, U.S. Pat. No. 3,308,957, the Frantz filter, which is considered prototypical of the paper towel or toilet paper filter, and U.S. Pat. No. 3,504,803 to Brayman and U.S. Pat. No. 4,017,400 to Schade.

Each such patent discloses an axially wound roll of filter material described generally as being a paper towel or toilet paper roll, the rolls subsisting upon a supporting cardboard tube (for instance, the Yee patent, Item 35). This tube is supported contactingly by an inner cylinder or rod pipe axially extending within the filter canister, which forms one of the flow paths for the oil to be filtered. Various forms of plates, gaskets or knife edge seals are then depressed into the end of the roll to restrict the flow of fluid to an axial path through the papers of the towel, avoiding bypass conditions.

SUMMARY OF THE INVENTION

In paper towel filters of the described type, a continuing problem remains that a paper towel filter element, with its contained contaminant, is not structurally designed for filter use.

Additionally, the requirement that seals be placed on the ends of the filter element and that the axial cardboard tube be supported through its length to prevent disintegration of the filter medium or fluid channelling around the filter element restricts any given filter to a specific brand and size of paper towels or paper. Thus one of the principal advantages of these filters, the use of a commonly available filter element, actually proves somewhat illusory. Paper towels or toilet paper rolls are available in a wide variety of diameters and sizes depending upon the manufacturing practices of the particular manufacturer and the density of the towels concerned. The cardboard inner tube is not standardized in diameter; the paper towels and toilet paper rolls in fact are not designed for filtration service at all.

As a result, a paper towel filter manufacturer is often forced to specify a specific trademark brand and size of paper towel for use of the filter. The paper towel filter manufacturer has no control over the manufacturer of paper towels, who is responding to a much larger, consumer oriented commodity market. A filter manufacturer is thus subject to having the designed size of towel suddenly removed from the market, obsoleting the filter.

This invention discloses a particular form of paper towel roll end support for use within a paper towel filter, in conjunction with a high tolerance central supporting axial tube permitting the external installation of a paper towel roll about the supporting axial tube, the roll clamped between two such end plates, the entire forming a filter cartridge which can then be inserted through or around the central oil pipe of a typical paper towel filter.

As a result, this cartridge forms an individually removable filter element which can be easily removed from a paper towel filter canister and then disassembled under suitable conditions for proper disposal of the contaminated paper towel roll.

Additionally, the design of the end plates shows a particular form of central tube support which permits the engagement of a relatively wide range of sizes of inner cardboard tubes spanning the typically encountered range and tolerance of inner diameters of paper towels as are found currently in the market. This permits any of a large number of paper towels to be used to make up a paper towel filter element, something that has not previously been possible.

The specific shape of the central support member of the paper towel filter end plate, in conjunction with the use of an independent axial supporting tube permits the use of a wide variety of paper towels to make a usable paper towel filter canister for insertion within a paper towel filter.

It is thus an object of the invention to disclose a form of end plate for a paper towel roll filter element which permits the use of a wide range of diameters of paper towel rolls within a specific filter canister.

It is a further object of this invention to disclose a combination of end plate and support tube which is capable of making an independently removable filter cartridge from a paper towel roll filter element within a paper towel filter.

It is a further object of this invention to disclose an apparatus for permitting the easy, clean removal of a used, contaminated paper towel roll filter element from within a paper towel filter.

It is a further object of this invention to disclose an apparatus for adapting a wide range of sizes of paper towel rolls to form a suitable filter element for use within a single sized paper towel filter.

These and other objects of the invention may be more clearly seen from the detailed description of the preferred embodiment which follows.

DETAILED DESCRIPTION OF THE PREFERRED EMBODIMENT

Figure 1:
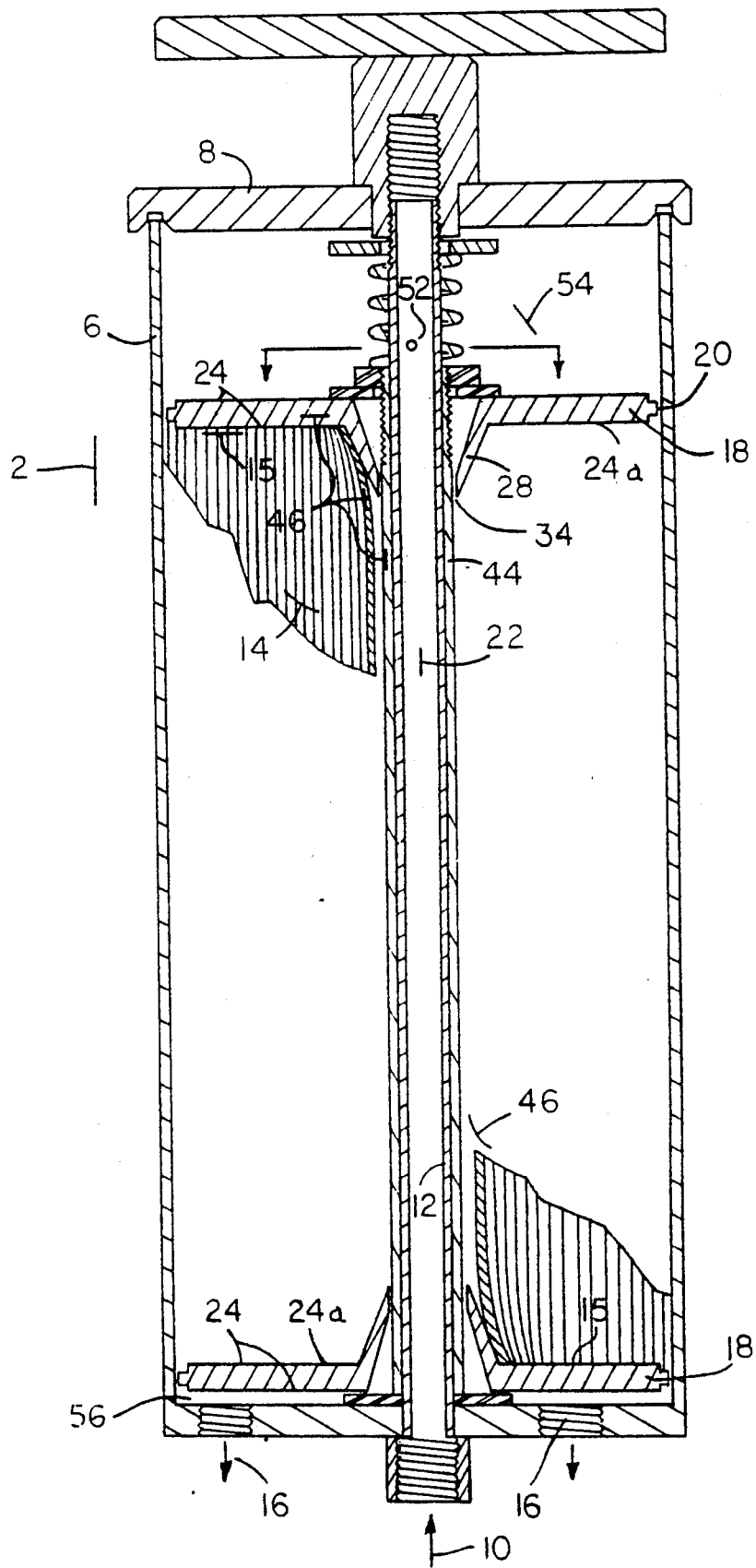
FIG. 1 shows a sectioned view of the apparatus of the invention installed within a paper towel filter.
Figure 2:
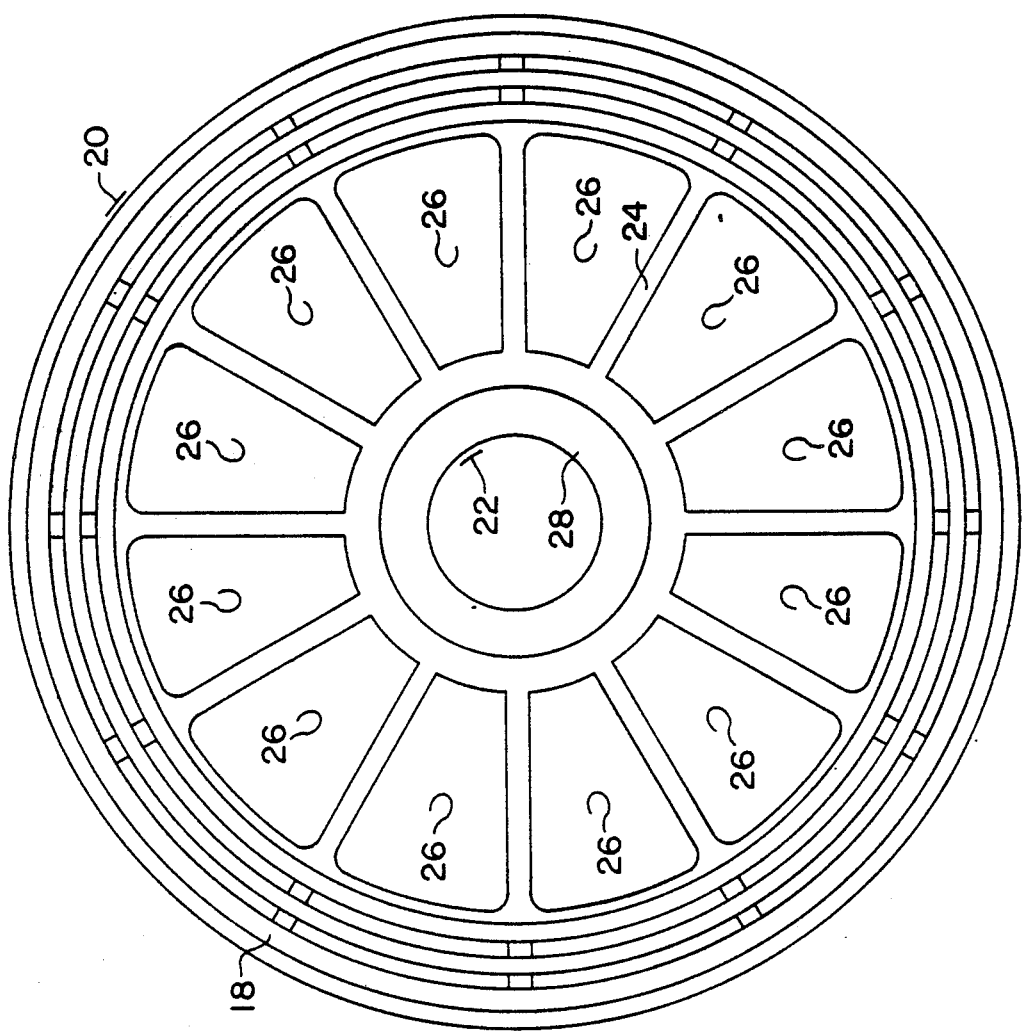
FIG. 2 shows a face view of an inplate of the invention.
Figure 3:
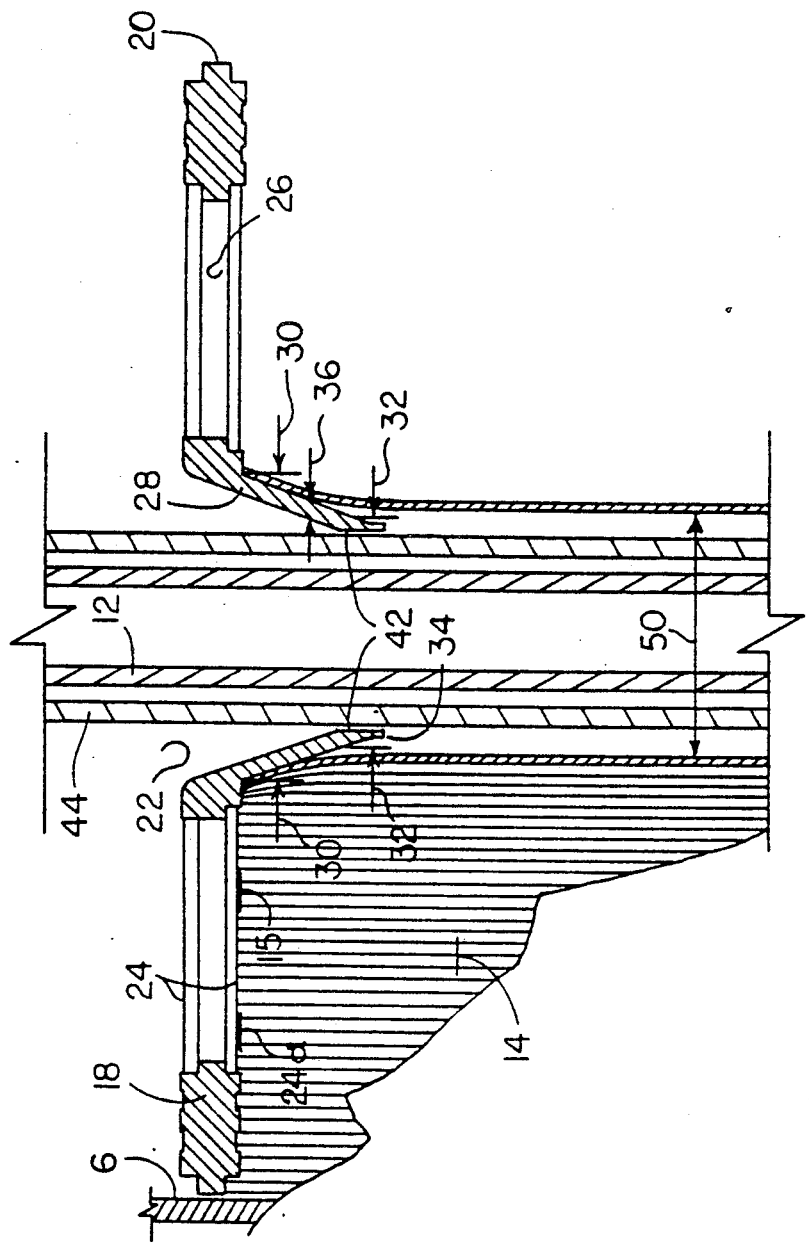
FIG. 3 is a detailed section of the portion of the end plate of the invention for adapting to a wide range of paper towel element sizes.

For purposes of description, this detailed description describes a particular form of paper towel filter for filtering oil in bypass service. It should be understood that the specifics of the particular flow within this filter are particular to this kind of filter; for example, a fuel filter of the same general construction would have a reversed direction of flow of fluid for filter purposes, and similar filter for such services as cleaning solvent, paint thinners, water, or air do not contain the flow restriction means described below. Therefore, nothing in this detailed description should be considered to restrict this invention to use within a filter having either flow restriction or direction of flow as described below.

The drawings show a paper towel filter 2, comprising a filter canister 6 of generally cylindrical shape, having a removable lid 8 for access to the interior of the filter canister 6. A fluid inlet 10, usually a threaded section for receiving a fluid line, connects internally to an internal fluid flow tube 12, for conducting the fluid or medium to be filtered to one end of the filter canister 6.

The fluid to be filtered then flows through a filter element 14, and then exits the canister through a fluid outlet 16.

The axially wound filter element 14 is typically a commercially available roll of paper towels, and provides filtration by the axial flow of the fluid to be filtered along the surface between tightly wound adjacent sheets. Such flow is capable of removing very fine contaminants including polymerized oxidation byproducts created in the oil by usage, and is capable of restoring the oil to essentially a new condition. Commercially available paper towel rolls, however, are not designed or manufactured for use as a filter element; paper towels are built to meet a commercial demand as a consumer product, as are rolls of toilet paper, the second most common used filter element within axially wound filter element filters. Thus, the composition of the paper towels, the dimension of the rolls of paper towels including most importantly the inner diameter of the tube upon which every commercially available paper towel roll is mounted, are variable. These dimensions vary between manufacturers, between various sizes of paper rolls within a given manufacturer's line, and even for a specific brand and size of paper towel vary between sequential rolls due to relaxed tolerances inherent in any process for creating a low cost, widely distributed consumer product.

Because this filter element must be sealed within the filter canister 6 so that the fluid to be filtered passes axially through the paper and does not bypass the filter element, prior art filters have been designed for a specific brand and size of paper towel and have introduced various structures for sealing the ends 15 of the paper towel filter element 14. All such element must be designed to relatively tight tolerances for a single roll.

In the invention, filter element 14 is supported between two end plates 18. Each such end plate 18 is a circular disk having an outer circumference 20 sized to fit contactingly within canister 6, and also having an inner circular aperture 22, of a size to permit passage of at least the oil pipe 12.

Between the faces 24 of the end plate 18 pass a plurality of oil passages 26 through which the oil to be filtered will flow to the ends 15 of the filter element 14 thence through the filter element 14.

From an inner face 24a of each of the end plates 18 extends a truncated conical central support member 28. Conical central support member 28 has a base or first diameter 30, adjacent the face 24a of the end plate 18; as a conical structure the external diameter of central support 28 decreases to a second diameter 32 at the end 34 of central support member 28, away from the face 24a of end plate 18.

Conical support member 28, in cross section is preferably of a tapered thickness having a greater thickness 36 proximate to the face 24a of the end plate 18, narrowing to a lesser thickness 36 proximate the end 34. This tapering of thickness 36 creates an inner conical shape 40 which narrows down to a tube sealing face 42, a smooth, cylindrical section, proximate end 34 of central support member 28, and sized to form a sealingly enclosing fit on an axial support tube 44.

It should be noted that by reason of inner conical shape 40, end plate 18 is supported upon axial support tube 44 only at tube sealing face 42 but not along the remainder of central supporting member 28.

For reasons of economy of manufacture it is considered preferably that end plate 18, including central support member 28, be formed as a single extruded or injection molded component, preferably of a structural plastic such as glass-filled nylon.

Nonetheless it can be seen that a suitable end plate 18 might be made of two sections so long as the conical support member 28 extends around the inner circular aperture 22, showing the taper from first diameter 30 to second diameter 32 on its exterior and having a sealing engagement with axial support tube 44. It is conceivable that such sealing engagement may be by means of any of a number of seals whether inserted seals such as O-rings or plated metal seals such as a plated sealing or bearing metal upon the tube sealing face 42, or by bonded plastic or similar material. It has simply been found that the tube sealing face 42 may be adequately provided by forming the entire end plate 18 including the conical supporting member 28 from a single monolithic piece of a suitably chosen engineering or structural plastic.

End plates 18 and axial tube 44 and canister 6 are all of close tolerance construction. In discussing the meaning of "close tolerance" as it applies to the invention, the preferred embodiment here described for discussion will be given as illustration. Similar tolerances are required, and are achievable in other filter embodiments of the invention, such as fuel filters (exemplary of smaller filters using toilet paper as an element), solvent filters, hydraulic filters, water filters, etc.

The preferred embodiment is an oil bypass filter having a canister 6 with an inside diameter of 6 inches plus or minus 0.005 inches (five thousandths tolerance). The diameter of end plate 18 (and thus the outer circumference 20) is nominally 5.985 inches, likewise held to a plus or minus 0.005 inch tolerance (circumference +/−0.0157). It has been determined that by constructing axial supporting tube 44 of ASTM schedule 80 pipe, of nominally one inch outer diameter, that the maximum variance encountered, for both galvanized (used in water based fluid filters) and "black iron" pipes (preferred for oil based fluids) is 0.012 inches. Therefore, if tube sealing face 42 is held to a five thousandths tolerance, sealing face 42 should have a nominal diameter 0.005 inches greater than the maximal schedule 120 pipe diameter (e.g. 0.75 inches +/−0.012 inches or 0.762 inches maximum diameter for axial tube 44).

Any resulting gap is of insignificant area compared with the effective filter area presented by the end plate faces 24, and thus no bypass problem, channelling of fluid around the filter element, exists in the filter. The stated tolerances are easily achieved by injection molding end plates 18 from glass fiber filled nylon.

Two such end plates 18 placed upon an axial supporting tube 44 thus clamp between them a paper towel roll filter element 14 forming a single unified filter cartridge 46. The inner diameter of axial support tube 44 is chosen to fit around central oil pipe 12. As above described, the outer circumference of the end plates 18 defines the fixed outer periphery of the filter cartridge 46 which is thus sized to fit contactingly within filter canister 6.

As previously stated, the paper towel roll filter element 14 may be of a number of diameters, especially of a varying inner diameter 50. This variation in inner diameters 50 is absorbed by assembling a first end plate 18 on axial support tube 44, then placing a paper towel roll filter element 14 over axial tube 44 and then clamping filter element 14 within the filter cartridge 46 by placing a second end plate 18 on axial support tube 44, driving the two end plates by pressure together into the ends 15 of the filter element 14. This drives the two opposing conical central support members 28 into and against the diameter 50 of the paper towel rolls forming a sealing fit so long as the inner diameter 50 of the paper towel rolls is less than first diameter 30 but greater than second diameter 32. It should be understood that a paper towel roll is a relatively ductile substance in comparison with the rigidity of the axial supporting tube 44 and the end plates 18, and a moderate amount of pressure, such as can be applied by hand in assembling the filter cartridge 46, is sufficient to conform the paper towel roll 14 to the filter.

Within the paper towel filter 2 the central oil pipe 12 is provided with a single flow control aperture 52, permitting flow of the fluid, in this example oil, to be filtered from within central oil pipe 12 to upper interior inlet section 54 of the filter. Flow control aperture 52 is sized, as is known in the art, so as to restrict the flow, at the operating pressure of the filter 2, to that which may be safely filtered, without structural failure, by the paper towel element 14. A typical size is 5/64 inch diameter in an oil pipe of ⅝" diameter. The oil or fluid to be filtered passes, as has been described, axially through paper towel element 14 within the filter cartridge 46. The effect of the oil and its contaminants weakens the element 14, which then expands under pressure and the effects of absorption of fluid and contaminants, outwardly against the filter canister 6 and inwardly against the axial support tube 44. The oil passages 26 within the end plates 18 restrict the flow of the oil to be filtered to flow axially through the filter element 14 thence into interior outlet section 56. The fluid then flows out of the fluid outlet 16, typically returning to an oil sump.

The pressure drop across the filter 2 occasioned by the use of the flow control aperture 52 and the resistance to flow of the filter element 14 permit such a filter 2 to be installed directly from a high pressure side of an engine lubrication oil system, such as on the pressure outlet of the pump, with direct return to the sump, without adversely affecting desired lubrication pressures within the engine. This so-called bypass filtration provides a continual oil cleaning effect during engine operation, removing especially those oxidation products and fine contaminants which the normal engine lubrication filter cannot remove. Thus the filter 2 typically is known to extend the working life of a lubricating fluid in an engine by a considerable amount of time over that experienced in a similar engine under similar operating circumstances where such a filter is not installed. This is in distinction to full flow filtration. For example, there is virtually no pressure drop across fuel, air, or solvent filters which control flow by having one ⅜" inlet and four ¼" outlets.

By use of close tolerance tubing, and holding such tolerances through precision injection molding of the end plates 18, and use of the conical support member 28 to hold varying sizes of paper towels in place, complicated seals and problems associated with channelling are minimized.

At some point the filter element 14 will require replacement to continue useful filtering. Whereas in the prior art it was necessary occasionally to dig the by now contaminated and expanded paper towel roll from within the body of the filter canister 6, the filter cartridge 46 of the invention may be readily removed by grasping an extension of the axial supporting tube 44 and pulling the entire filter cartridge 46 as a unit from within canister 6. Filter cartridge 46 may then be removed to a place permitting the convenient and relatively clean disposal of the used filter element 14, and disassembled by removing end plates 18 from the axial tube 44. Paper towel element 14 may then be removed as required from axial tube element 44, a new paper towel inserted over the axial tube 44, the end plates replaced and the assembled filter cartridge then reinserted within the filter canister. This provides for a much speedier and clean replacement of a paper towel element within such a filter.

While the description given above is concentrated upon the particular structure of the end plates found preferable in the invention, and separable end plates are required in order to permit removal and replacement of paper towel filter elements, it should be apparent that the invention extends to the physical structure of the end plates, permitting the use of a wide range of diameters of paper towel filter element, as well as to the removable filter canister which may thereby be created for convenient use within existing paper towel filters. The invention thus extends beyond the specific preferred embodiment described and shown in the drawings to that wider range of equivalents as are inherent in this specification and as are claimed.

I claim:

1. An apparatus for the support of an axially wound filter element within a filter, said axially wound filter element having a central tube defining an inner diameter; said filter having a central oil pipe; said apparatus comprising:

said central tube adapted to fit over said central pipe;
a first and a second end plate;
said axially wound filter element being enclosingly supported between said first and second end plate;

each said end plate having a tapered conical support member extending from a central aperture thereof in a direction towards said axially wound filter;

said tapered conical support member having a diameter proximate the said end plate greater than the inner diameter of said filter element, having a diameter distal of said plate less than the inner diameter of said filter element; and said tapered conical support member having an internal pipe sealing face, said pipe sealing face being of the diameter of said central tube, sealingly engaging therewith.

2. The apparatus of claim 1 above wherein said tapered conical support member is composed of a ductile material.

3. The apparatus as described in claim 1 above wherein said tapered conical support member is spaced a noncontacting distance from said tube other than at the sealing face thereof.

* * * * *